(12) United States Patent
Lai et al.

(10) Patent No.: US 11,250,299 B2
(45) Date of Patent: Feb. 15, 2022

(54) LEARNING REPRESENTATIONS OF GENERALIZED CROSS-MODAL ENTAILMENT TASKS

(71) Applicant: NEC Laboratories America, Inc., Princeton, NJ (US)

(72) Inventors: Farley Lai, Plainsboro, NJ (US); Asim Kadav, Jersey City, NJ (US); Ning Xie, Fairborn, OH (US)

(73) Assignee: NEC Corporation

( * ) Notice: Subject to any disclaimer, the term of this patent is extended or adjusted under 35 U.S.C. 154(b) by 70 days.

(21) Appl. No.: 16/668,680

(22) Filed: Oct. 30, 2019

(65) Prior Publication Data
US 2020/0143211 A1    May 7, 2020

Related U.S. Application Data

(60) Provisional application No. 62/753,971, filed on Nov. 1, 2018.

(51) Int. Cl.
*G06K 9/00* (2006.01)
*G06K 9/62* (2022.01)
(Continued)

(52) U.S. Cl.
CPC ......... *G06K 9/6267* (2013.01); *G06K 9/3233* (2013.01); *G06K 9/46* (2013.01);
(Continued)

(58) Field of Classification Search
CPC ...... G06K 9/6267; G06K 9/3233; G06K 9/46; G06K 9/6262; G06K 9/726; G06N 3/0445; G06N 3/08
See application file for complete search history.

(56) References Cited

U.S. PATENT DOCUMENTS 9,965,705 B2 * 5/2018 Chen ........................ G06N 5/04
2018/0181592 A1 * 6/2018 Chen ................... G06F 16/5838
2020/0320387 A1 * 10/2020 Ghaeini ................. G06F 40/20

OTHER PUBLICATIONS

Izadinia et al, Segment-Phrase Table for Semantic Segment, Visual Entailment and Paraphrasing, arXiv 1509.08075v1 (Year: 2015 ).*

(Continued)

*Primary Examiner* — Ping Y Hsieh
*Assistant Examiner* — Xiao Liu
(74) *Attorney, Agent, or Firm* — Joseph Kolodka

(57) ABSTRACT

A method is provided for determining entailment between an input premise and an input hypothesis of different modalities. The method includes extracting features from the input hypothesis and an entirety of and regions of interest in the input premise. The method further includes deriving intra-modal relevant information while suppressing intra-modal irrelevant information, based on intra-modal interactions between elementary ones of the features of the input hypothesis and between elementary ones of the features of the input premise. The method also includes attaching cross-modal relevant information to the features from the input premise to the features from the input hypothesis to form a cross-modal representation, based on cross-modal interactions between pairs of different elementary features from different modalities. The method additionally includes classifying a relationship between the input premise and the input hypothesis using a label selected from the group consisting of entailment, neutral, and contradiction based on the cross-modal representation.

19 Claims, 7 Drawing Sheets

(51) Int. Cl.
*G06N 3/04* (2006.01)
*G06N 3/08* (2006.01)
*G06K 9/46* (2006.01)
*G06K 9/72* (2006.01)
*G06K 9/32* (2006.01)

(52) U.S. Cl.
CPC ........... *G06K 9/6262* (2013.01); *G06K 9/726* (2013.01); *G06N 3/0445* (2013.01); *G06N 3/08* (2013.01)

(56) References Cited

OTHER PUBLICATIONS

He, et al, Mask R-CNN, arXiv 1703.068703v3 (Year: 2018).*
Vu et al., "Grounded Textual Entailment", Proceedings of the 27th International Conference on Computational Linguistics, Aug. 2018, pp. 2354-2368.

* cited by examiner

LEARNING REPRESENTATIONS OF GENERALIZED CROSS-MODAL ENTAILMENT TASKS

RELATED APPLICATION INFORMATION

This application claims priority to U.S. Provisional Patent Application Ser. No. 62/753,971, filed on Nov. 1, 2018, incorporated herein by reference herein its entirety.

BACKGROUND

Technical Field

The present invention relates to information processing and more particularly to learning representations of generalized cross-modal entailment tasks.

Description of the Related Art

Misinformation and disinformation are spreading faster than ever through seemingly convincing pictures with captions to mislead the general public with obscured tiny details. Critical applications such as court cross-examination require examining evidence in a video clip or speech that potentially contradicts the testimony and vice versa. The core problem is an entailment task that takes inputs of a premise and a hypothesis to conclude whether the entailment relationship holds or there is contradiction in between. Otherwise, it is neutral which implies uncertainty. Unfortunately, it is time-consuming and laborious to manually perform fact-checking especially on inputs of different modalities. In view of the massive and growing fake news, more generalized forms of entailment tasks must be addressed across different input media in a machine learnable way to ensure reliable dialectical reasoning.

SUMMARY

According to an aspect of the present invention, a computer-implemented method is provided for determining entailment between an input premise and an input hypothesis of different modalities. The method includes extracting, by a hardware processor, features from the input hypothesis and an entirety of and regions of interest in the input premise. The method further includes deriving, by the hardware processor, intra-modal relevant information while suppressing intra-modal irrelevant information, based on intra-modal interactions between elementary ones of the features of the input hypothesis and between elementary ones of the features of the input premise. The method also includes attaching, by the hardware processor, cross-modal relevant information to the features from the input premise to the features from the input hypothesis to form a cross-modal representation, based on cross-modal interactions between pairs of different elementary features from different modalities. The method additionally includes classifying, by the hardware processor, a relationship between the input premise and the input hypothesis using a label selected from the group consisting of entailment, neutral, and contradiction based on the cross-modal representation.

According to another aspect of the present invention, a computer program product is provided for determining entailment between an input premise and an input hypothesis of different modalities. The computer program product includes a non-transitory computer readable storage medium having program instructions embodied therewith. The program instructions are executable by a computer to cause the computer to perform a method. The method includes extracting, by a hardware processor, features from the input hypothesis and an entirety of and regions of interest in the input premise. The method further includes deriving, by the hardware processor, intra-modal relevant information while suppressing intra-modal irrelevant information, based on intra-modal interactions between elementary ones of the features of the input hypothesis and between elementary ones of the features of the input premise. The method also includes attaching, by the hardware processor, cross-modal relevant information to the features from the input premise to the features from the input hypothesis to form a cross-modal representation, based on cross-modal interactions between pairs of different elementary features from different modalities. The method additionally includes classifying, by the hardware processor, a relationship between the input premise and the input hypothesis using a label selected from the group consisting of entailment, neutral, and contradiction based on the cross-modal representation.

According to yet another aspect of the present invention, a computer processing system is provided for determining entailment between an input premise and an input hypothesis of different modalities. The computer processing system includes a memory device including program code stored thereon. The computer processing system further includes a hardware processor, operatively coupled to the memory device, and configured to run the program code stored on the memory device to extract features from the input hypothesis and an entirety of and regions of interest in the input premise. The hardware processor further runs the program code to derive intra-modal relevant information while suppressing intra-modal irrelevant information, based on intra-modal interactions between elementary ones of the features of the input hypothesis and between elementary ones of the features of the input premise. The processor also runs the program code to attach cross-modal relevant information to the features from the input premise to the features from the input hypothesis to form a cross-modal representation, based on cross-modal interactions between pairs of different elementary features from different modalities. The processor additionally runs the program code to classify a relationship between the input premise and the input hypothesis using a label selected from the group consisting of entailment, neutral, and contradiction based on the cross-modal representation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to learning representations of generalized cross-modal entailment tasks.

A generalized entailment task includes a premise and a hypothesis potentially in different modalities, each of which may include one or more input elements.

In an embodiment, the input sentence hypothesis is tokenized and converted into word embeddings which then go through self-attention to extract important features and a recurrent neural network component, gated recurrent unit (GRU), to derive overall sentence hypothesis features. Similarly, a detector and/or convolutional neural network (CNN) can be used to extract the features of the input image premise which next go through self-attention to produce significant features for the hypothesis features to attend to. Note the image objects in region of interest can be at the feature map level or semantic level in bounding boxes, either of which evolves over time but should not constrain the invention. To learn the representation for the entailment classification task, a cross-modal feature interaction between the sentence hypothesis and the image premise is performed, e.g., through the scaled dot-product attention, although some other function can also be used. The attention weights are applied to the self-attended features of the extracted image regions of interest to produce the representation for a final softmax classification of the entailment, neutral and contradiction labels.

Figure 1:
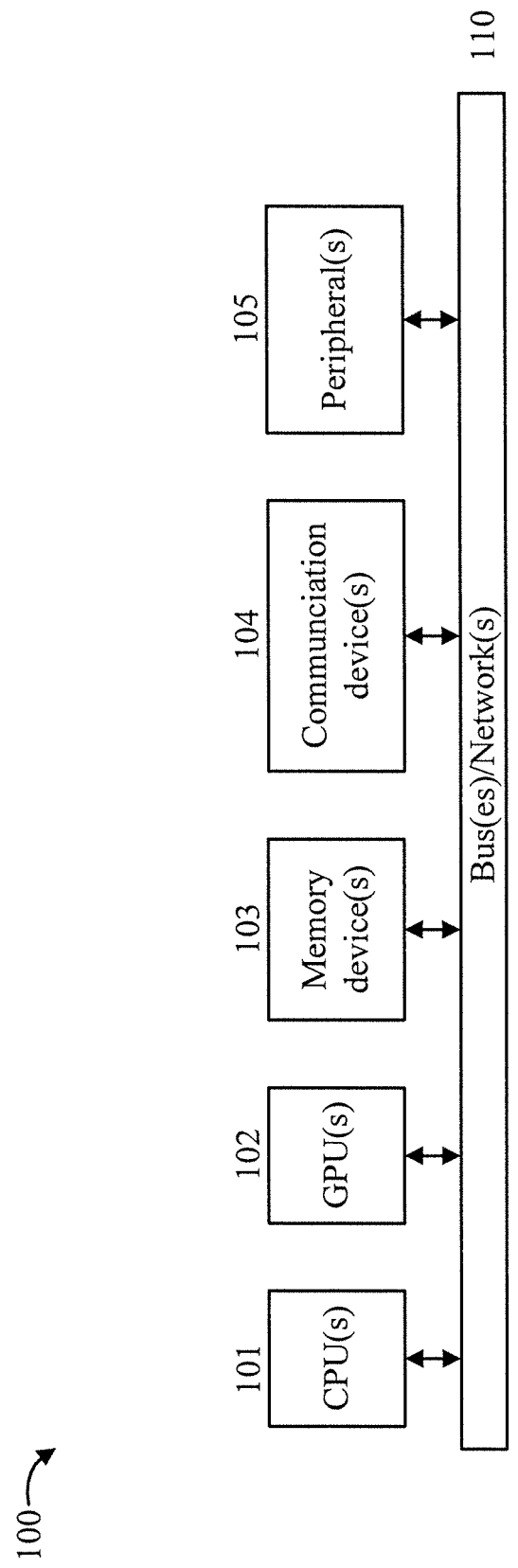
FIG. 1 is a block diagram showing an exemplary processing system 100, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. One or more of the modules of system 200 of FIG. 2 can be stored in at least one of the memory devices for executing by a processing element (e.g., CPU, GPU).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

Figure 2:
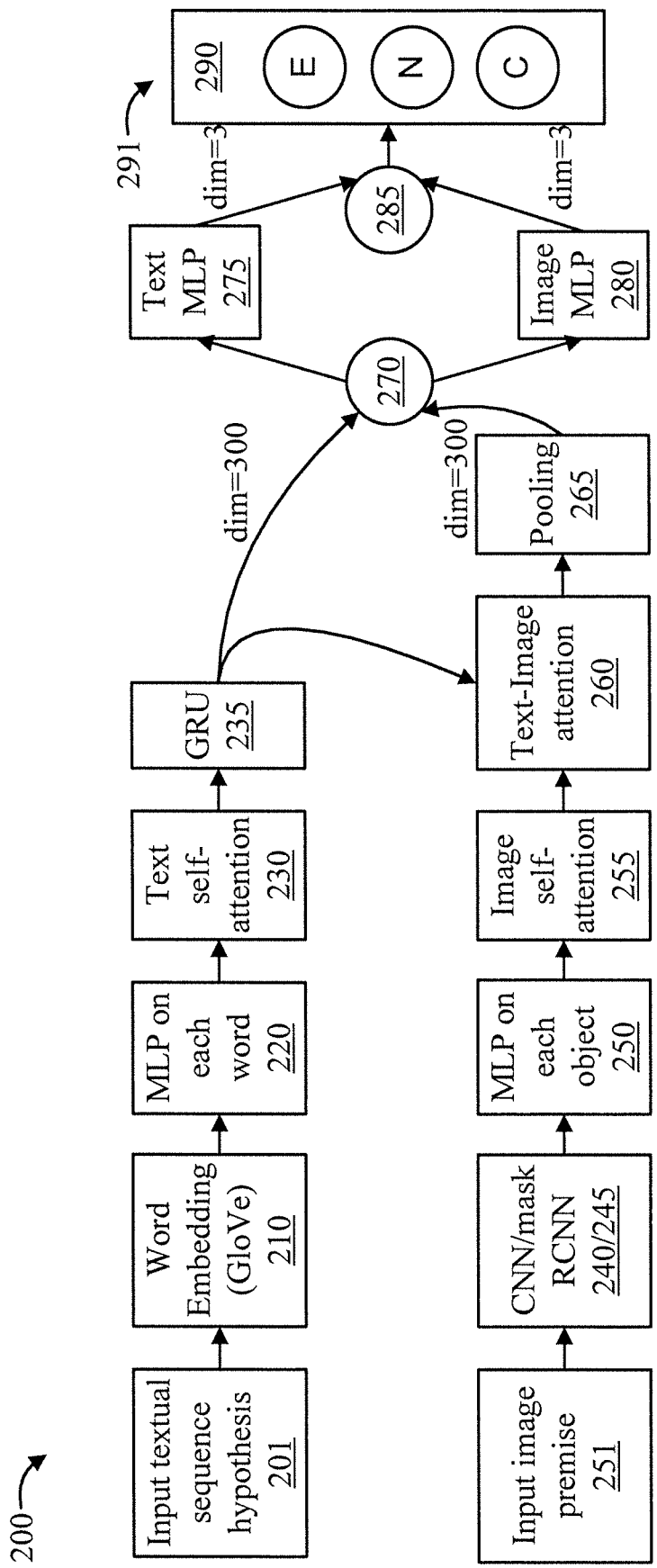
FIG. 2 is a block diagram showing an exemplary system for converting textual entailment tasks to visual entailment tasks, in accordance with an embodiment of the present invention.

FIG. 2 is a block diagram showing an exemplary system 200 for converting textual entailment tasks to visual entailment tasks, in accordance with an embodiment of the present invention.

The system 200 receives an input textual sequence hypothesis 201 and an input image premise 251 and outputs a classification 291 of entailment, neutral, or contradiction.

The system includes a word embedding module 210, a set of (word) Multi-Layer Perceptrons (MLPs) 220, a text self-attention module 230, a Gate Recurrent Unit (GRU) 235, a CNN 240, a Mask R-CNN 245, a set of (object) MLPs 250, an image self-attention module 255, a text-image attention module 260, a pooling module 265, a merging module 270, a text MLP 275, an image MLP 280, a merging module 285, and a softmax function 290.

The combination of the text self-attention module 230 and the image self-attention module 255 are used to find inner hidden relationships.

The text-image attention module 260 is used to ground relevant corresponding objects in the premise.

The combination of the merging module 270, the text MLP 275, the image MLP 280, and the merging module 285 employ a split-transform-merge strategy that adds more representational power to the input to the softmax function 290.

It is to be appreciated that while an input textual sequence hypothesis and corresponding image are used in the example of FIG. 2, in other embodiments, an input textual sentence and corresponding audio sequence can be used. In such a case, features can be extracted in both time and frequency domains using, e.g., a speech recognition system. Hence, in an embodiment, a system in accordance with the present invention can include a speech recognition system for processing acoustic premises.

A description will now be given regarding intra-modal interaction, in accordance with an embodiment of the present invention. For each feature modality, the interaction between elementary features in the same modality is computed to retain relevant information while suppressing irrelevant details to improve the feature quality.

A description will now be given regarding cross-modal interaction, in accordance with an embodiment of the present invention. For each pair of different elementary features from different modalities, the interaction is computed to attach relevant information from the premise features to the hypothesis features for the entailment task.

Elementary features can be identified from among all of the features of the input image premise and the input textual sequence hypothesis by applying one or more self-attention processes to the features/feature representations.

A description will now be given regarding classification. The hypothesis feature representation with relevant premise features attached is merged for the final classifier to conclude the entailment, neutral or contradiction label. In an embodiment, the final representation may be transformed through one or more MLPs, dropout and/or activation layers to improve the performance by making the features merged in block 285 more discriminative.

Figure 3:
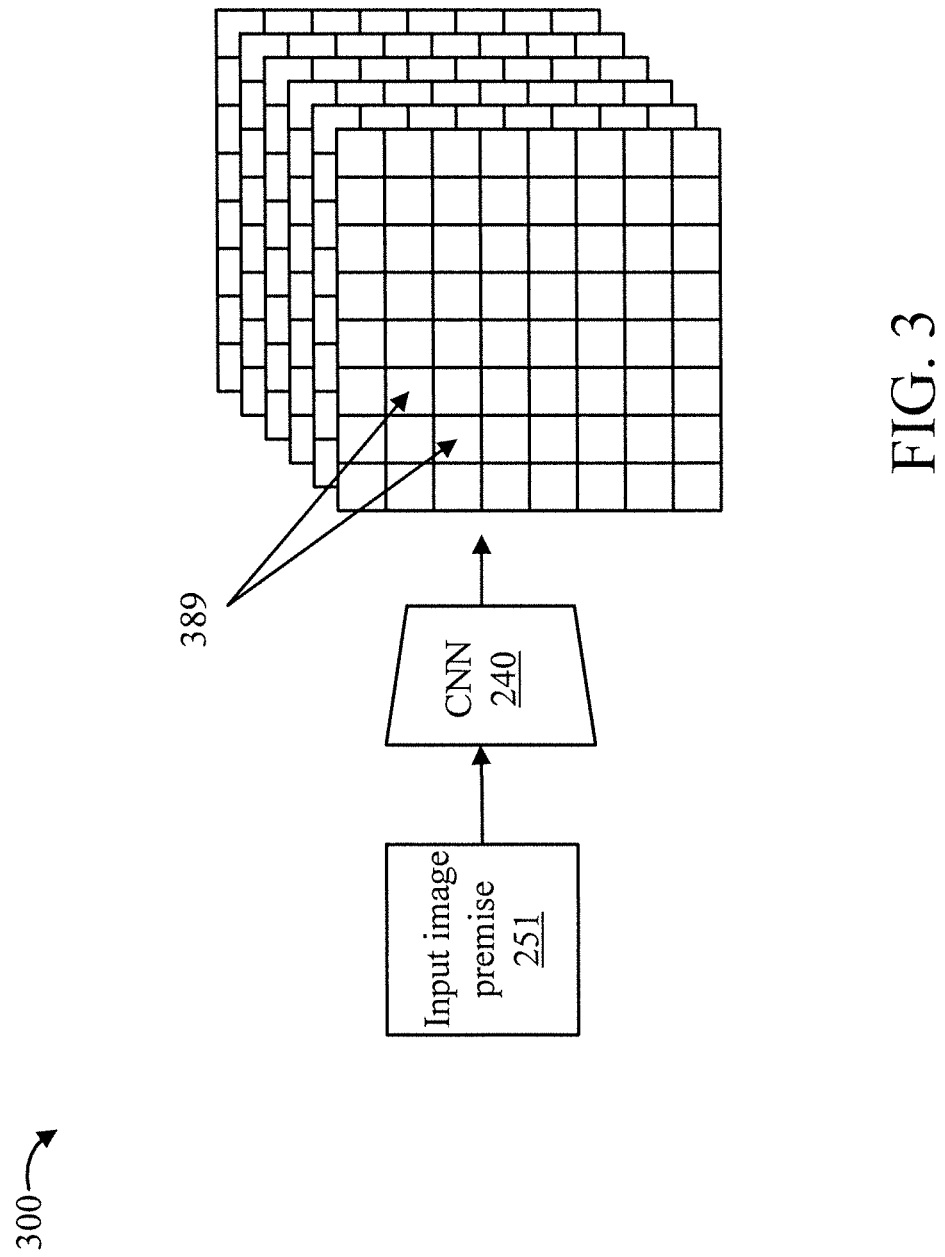
FIG. 3 is a block diagram further showing processing by the Convolutional Neural Network (CNN) of FIG. 2, in accordance with an embodiment of the present invention.

FIG. 3 is a block diagram further showing processing 300 by the CNN of FIG. 2, in accordance with an embodiment of the present invention. In an embodiment, the CNN 240 identifies objects 389 in the entirety of the input image premise 251.

Figure 4:
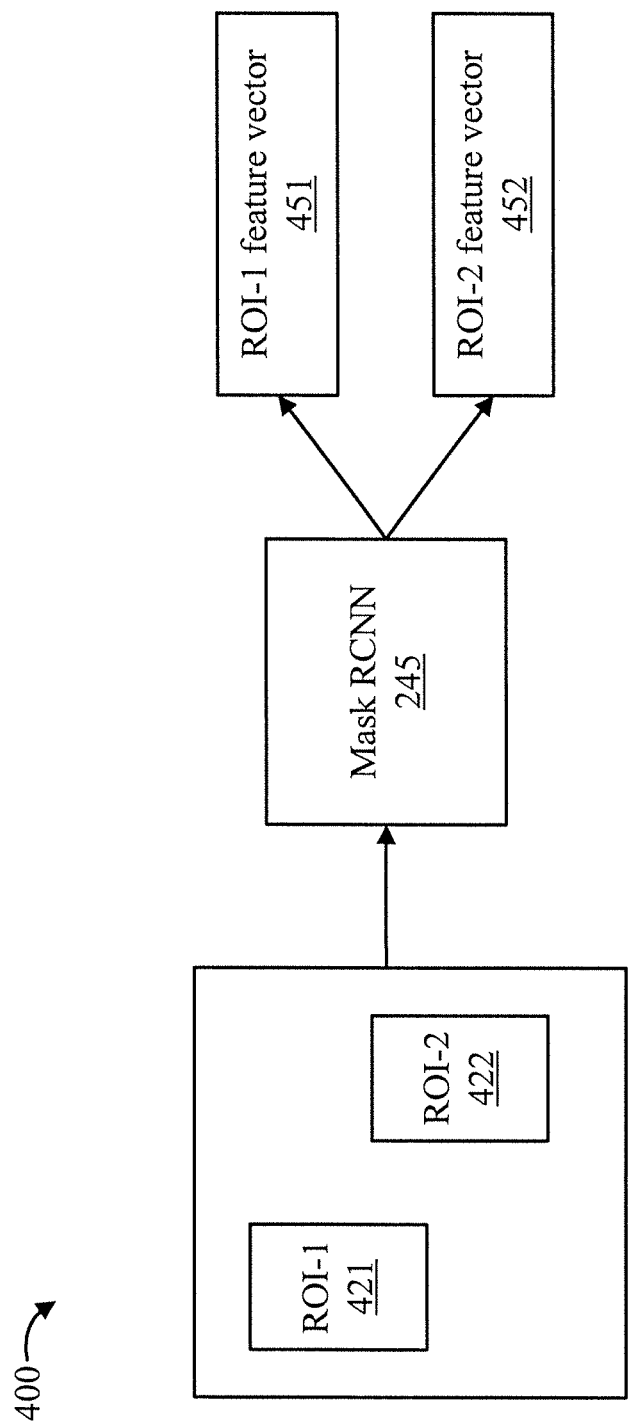
FIG. 4 is a block diagram further showing processing by the Mask Region-based Convolutional Neural Network (Mask R-CNN) of FIG. 2, in accordance with an embodiment of the present invention.

FIG. 4 is a block diagram further showing processing 400 by the Mask R-CNN of FIG. 2, in accordance with an embodiment of the present invention. In an embodiment, the Mask R-CNN 245 forms ROI feature vectors 451 and 452 for various regions of interest 421 and 422 in the input image premise 251.

Figure 5:
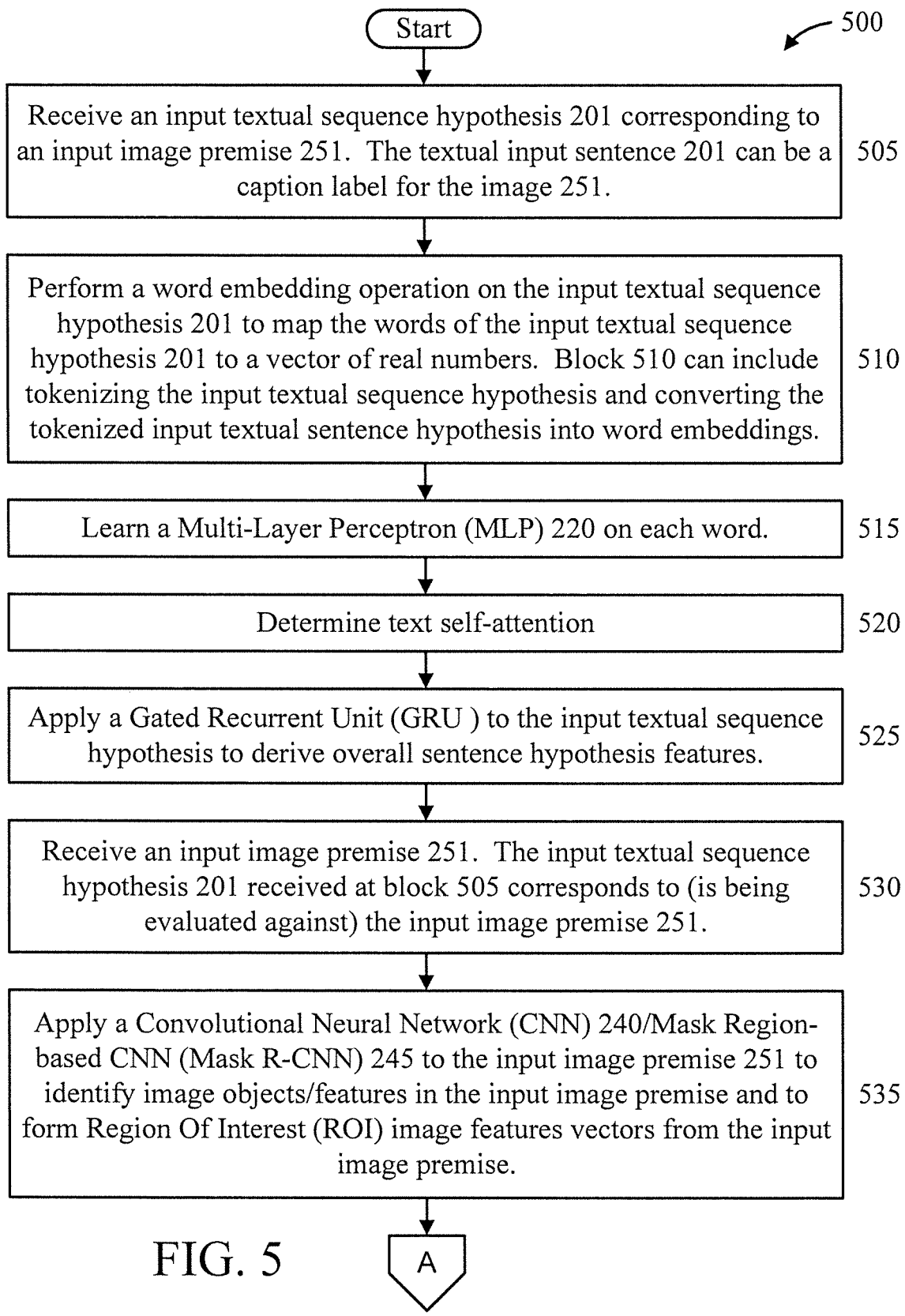
FIGS. 5-7 are flow diagrams showing an exemplary method for converting textual entailment tasks to visual entailment tasks, in accordance with an embodiment of the present invention.
Figure 6:
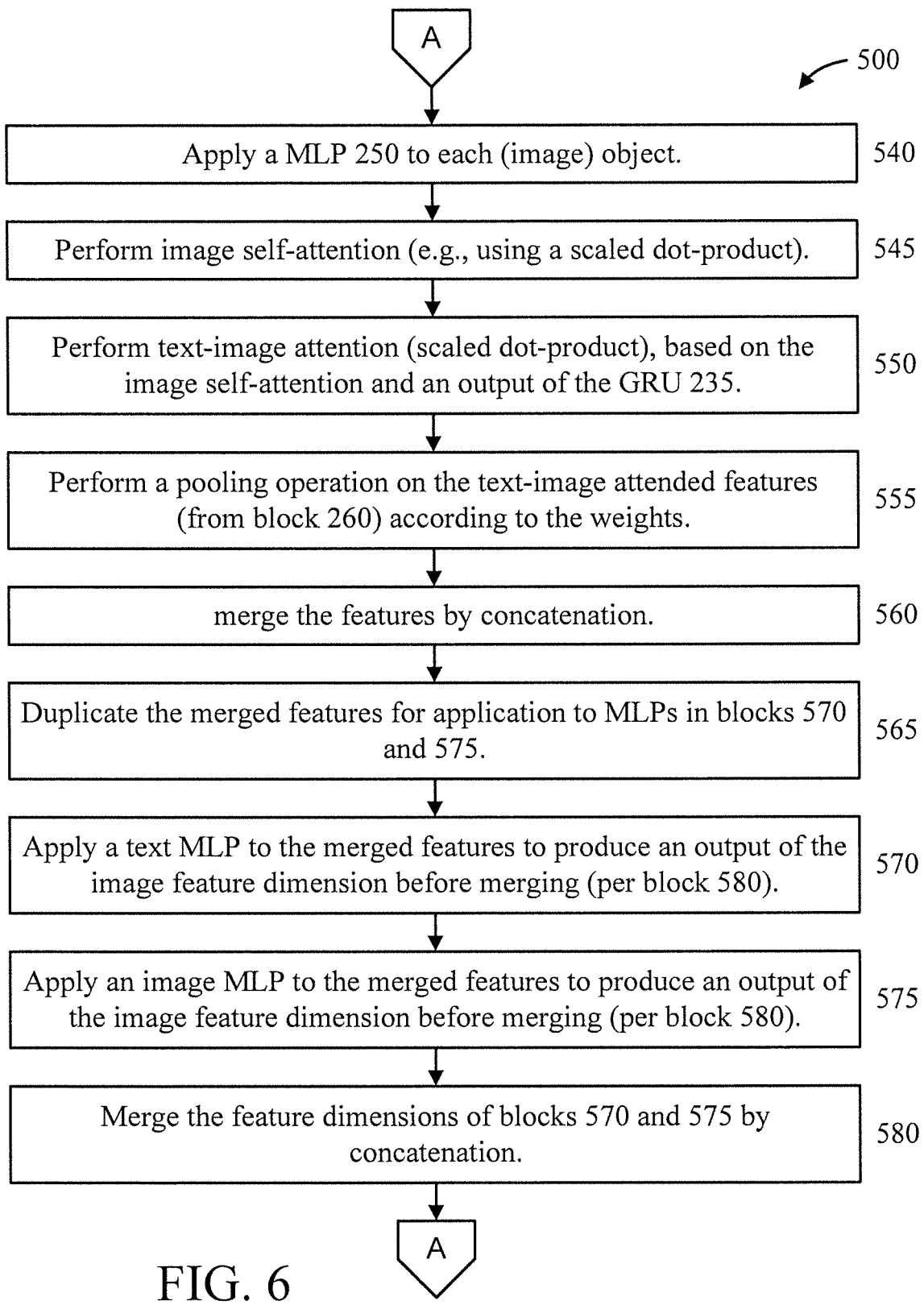
Figure 7:
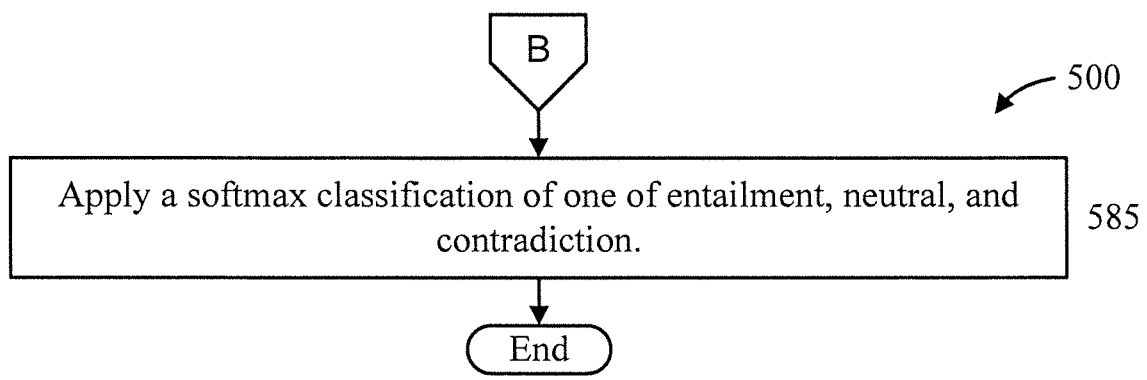

FIGS. 5-7 are flow diagrams showing an exemplary method 500 for converting textual entailment tasks to visual entailment tasks, in accordance with an embodiment of the present invention.

At block 505, receive an input textual sequence hypothesis 201 corresponding to an input image premise 251. In an embodiment, the textual input sentence 201 can be a caption label for the image 251.

At block 510, perform a word embedding operation on the input textual sequence hypothesis 201 to map the words of the input textual sequence hypothesis 201 to a vector of real numbers. In an embodiment, block 510 can include tokenizing the input textual sequence hypothesis and converting the tokenized input textual sentence hypothesis into word embeddings. In an embodiment, GloVe can be used. GloVe is an unsupervised learning algorithm for obtaining vector representations for words. Training is performed on aggregated global word-word co-occurrence statistics from a corpus, and the resulting representations showcase interesting linear substructures of the word vector space.

At block 515, learn a Multi-Layer Perceptron (MLP) 220 on each word.

At block 520, determine text self-attention (e.g., using a scaled dot-product).

At block 525, apply a Gated Recurrent Unit (GRU) to the input textual sequence hypothesis to derive overall sentence hypothesis features.

At block 530, receive an input image premise 251. The input textual sequence hypothesis 201 received at block 505 corresponds to (is being evaluated against) the input image premise 251.

At block 535, apply a Convolutional Neural Network (CNN) 240/Mask Region-based CNN (Mask R-CNN) 245 to the input image premise 251 to identify image objects/features in the input image premise and to form Region Of Interest (ROI) image features vectors from the input image premise. In an embodiment, the CNN 240 identifies objects in the entirety of the input image premise, and the Mask R-CNN 245 forms feature vectors for various regions of interest in the input image premise.

At block 540, apply a MLP 250 to each (image) object.

At block 545, perform image self-attention (e.g., using a scaled dot-product).

At block 550 perform text-image attention (scaled dot-product), based on the image self-attention and an output of the GRU 235.

At block 555, perform a pooling operation on the text-image attended features (from block 260) according to the weights.

At block 560, merge the features by concatenation.

At block 565, duplicate the merged features for application to MLPs in blocks 570 and 575.

At block 570, apply a text MLP to the merged features to produce an output of the text feature dimension before merging (per block 580).

At block 575, apply an image MLP to the merged features to produce an output of the image feature dimension before merging (per block 580).

At block 580, merge the feature dimensions of blocks 570 and 575 by concatenation. The output of block 580 goes through one or more fully-connected layers to produce logits followed by softmax for the final classification 53. The output block 580 is the learned cross-modal representation which can be used in a variety of applications.

At block 585, apply a softmax classification of one of entailment, neutral, and contradiction.

The output of blocks 580 and 585 can be used for a variety of applications including determining the veracity (fakeness) of news, evaluating evidence such as testimony in a trial, and so forth. Responsive to a determination of fakeness, other new sources can be accessed as additional sources in order to present the user with varied opinions and perhaps more verified stories having an entailment label versus a neutral or contradiction label. In this way, more accurate news can be presented to a user. In an application of court cross-examination, the lawyer needs to review the evidence at hand in the forms of a picture, a video or audio recording as the premise to decide whether the testimony as the hypothesis is consistent with the evidence. If there is inconsistency, then some neutral or contradiction relationship must be inferred in this cross-modal entailment task.

In an embodiment, any of attention blocks 230, 255, and 260 can involve taking a query (e.g., a hypothesis) and keys (objects in the premise) to compute a similarity therebetween in the form of weights. Frequently used similarity functions can include, but are not limited to, dot product, splice, detector, and so forth. The next step can involve applying a softmax function to normalize the weights. Then the values (of the key-value pairs) are scaled by the weights to obtain a final text or image self-attention depending on the involved block. When the queries and keys are from the same modality, then self-attention is performed. Otherwise, it's a cross-modal attention such as text-image attention.

Method 500 can involve identifying elementary features from among all of the features of the input image premise and the input textual sequence hypothesis. This is achieved by applying one or more self-attention processes to the inputs of method 500.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for determining entailment between an input premise and an input hypothesis of different modalities, comprising:
   extracting, by a hardware processor applying a Mask Region Convolutional Neural Network (R-CNN), features from the input hypothesis and an entirety of and regions of interest in the input premise;
   deriving, by the hardware processor, intra-modal relevant information while suppressing intra-modal irrelevant information, based on intra-modal interactions between elementary ones of the features of the input hypothesis and between elementary ones of the features of the input premise;
   attaching, by the hardware processor, cross-modal relevant information to the features from the input premise to the features from the input hypothesis by deriving, using a gated recurrent unit, overall sentence hypothesis features from an output of a text self-attention process to form a cross-modal representation, based on cross-modal interactions between pairs of different elementary features from different modalities;
   providing labels consisting of entailment, neutral, and contradiction for classification usage; and
   classifying, by the hardware processor, a relationship between the input premise and the input hypothesis using a label selected from a group consisting of entailment, neutral, and contradiction based on the cross-modal representation.

2. The computer-implemented method of claim 1, wherein the hardware process extracts the features from the entirety of the input image premise using a Convolutional Neural Network.

3. The computer-implemented method of claim 2, wherein the hardware process extracts the features from the regions of interest in the input image premise using a Mask Region-based Convolutional Neural Network.

4. The computer-implemented method of claim 1, wherein said deriving step use a self-attention process to identify the elementary ones of the features from an entirety of the features.

5. The computer-implemented method of claim 1, wherein said extracting step comprises extracting region specific feature vectors for the input premise.

6. The computer-implemented method of claim 1, wherein the regions of interest are specified at a feature map level.

7. The computer-implemented method of claim 1, wherein the regions of interest are specified at a semantic level.

8. The computer-implemented method of claim 1, wherein said extracting step comprises forming a visual corpus from an existing textual corpus that includes textual premises and textual hypothesis by replacing the textual premises in the existing textual corpus with visual premises.

9. The computer-implemented method of claim 1, wherein the intra-modal relevant information is derived by performing a word embedding on the input textual sequence to obtain a vector of real numbers, and subjecting the vector of real numbers to a self-attention process.

10. The computer-implemented method of claim 1, wherein the relationship between the input premise and the input hypothesis is classified using a softmax process.

11. The computer-implemented method of claim 1, wherein the input premise comprises an input image premise, and the input hypothesis comprises an input textual sequence hypothesis.

12. A computer program product for determining entailment between an input premise and an input hypothesis of different modalities, the computer program product comprising a non-transitory computer readable storage medium having program instructions embodied therewith, the program instructions executable by a computer to cause the computer to perform a method comprising:
   extracting, by a hardware processor applying a Mask Region Convolutional Neural Network (R-CNN), features from the input hypothesis and an entirety of and regions of interest in the input premise;
   deriving, by the hardware processor, intra-modal relevant information while suppressing intra-modal irrelevant information, based on intra-modal interactions between elementary ones of the features of the input hypothesis and between elementary ones of the features of the input premise;

attaching, by the hardware processor, cross-modal relevant information to the features from the input premise to the features from the input hypothesis by deriving, using a gated recurrent unit, overall sentence hypothesis features from an output of a text self-attention process to form a cross-modal representation, based on cross-modal interactions between pairs of different elementary features from different modalities;

providing labels consisting of entailment, neutral, and contradiction for classification usage; and classifying, by the hardware processor, a relationship between the input premise and the input hypothesis using a label selected from a group consisting of entailment, neutral, and contradiction based on the cross-modal representation.

13. The computer program product of claim 12, wherein the hardware process extracts the features from the entirety of the input image premise using a Convolutional Neural Network.

14. The computer program product of claim 13, wherein the hardware process extracts the features from the regions of interest in the input image premise using a Mask Region-based Convolutional Neural Network.

15. The computer program product of claim 12, wherein said deriving step use a self-attention process to identify the elementary ones of the features from an entirety of the features.

16. The computer program product of claim 12, wherein said extracting step comprises extracting region specific feature vectors for the input premise.

17. The computer program product of claim 12, wherein the regions of interest are specified at a feature map level.

18. The computer program product of claim 12, wherein the regions of interest are specified at a semantic level.

19. A computer processing system for determining entailment between an input premise and an input hypothesis of different modalities, comprising:

a memory device including program code stored thereon;

a hardware processor, operatively coupled to the memory device, and configured to run the program code stored on the memory device to extract, by applying a Mask Region Convolutional Neural Network (R-CNN), features from the input hypothesis and an entirety of and regions of interest in the input premise;

derive intra-modal relevant information while suppressing intra-modal irrelevant information, based on intra-modal interactions between elementary ones of the features of the input hypothesis and between elementary ones of the features of the input premise;

attach cross-modal relevant information to the features from the input premise to the features from the input hypothesis by deriving, using a gated recurrent unit, overall sentence hypothesis features from an output of a text self-attention process to form a cross-modal representation, based on cross-modal interactions between pairs of different elementary features from different modalities;

providing labels consisting of entailment, neutral, and contradiction for classification usage; and classify a relationship between the input premise and the input hypothesis using a label selected from a group consisting of entailment, neutral, and contradiction based on the cross-modal representation.

* * * * *